United States Patent
Ma et al.

(10) Patent No.: US 12,032,099 B2
(45) Date of Patent: Jul. 9, 2024

(54) ADAPTIVE MOTION COMPENSATION OF PERCEPTION CHANNELS

(71) Applicant: CYNGN, INC., Menlo Park, CA (US)

(72) Inventors: Biao Ma, Sunnyvale, CA (US); Lior Tal, San Diego, CA (US)

(73) Assignee: CYNGN, INC., Menlo Park, CA (US)

( * ) Notice: Subject to any disclaimer, the term of this patent is extended or adjusted under 35 U.S.C. 154(b) by 0 days.

(21) Appl. No.: 17/812,072

(22) Filed: Jul. 12, 2022

(65) Prior Publication Data

US 2023/0009736 A1 Jan. 12, 2023

Related U.S. Application Data (60) Provisional application No. 63/366,738, filed on Jun. 21, 2022, provisional application No. 63/220,886, filed on Jul. 12, 2021.

(51) Int. Cl.
| | |
|---|---|
| *G01S 17/89* | (2020.01) |
| *G01F 15/18* | (2006.01) |
| *G01P 15/18* | (2013.01) |
| *G01S 7/497* | (2006.01) |

(52) U.S. Cl.
CPC .............. *G01S 7/497* (2013.01); *G01F 15/18* (2013.01); *G01S 17/89* (2013.01)

(58) Field of Classification Search
CPC .......... G01S 7/497; G01S 7/4808; G01S 7/51; G01S 17/89; G01S 17/42; G01S 17/66; G01P 15/18

See application file for complete search history.

(56) References Cited

U.S. PATENT DOCUMENTS

| | | | |
|---|---|---|---|
| 11,187,793 B1* | 11/2021 | Liu ..................... | G05D 1/0088 |
| 2012/0303176 A1 | 11/2012 | Wong et al. | |
| 2018/0299557 A1* | 10/2018 | Yi .......................... | G01S 17/89 |
| 2019/0235083 A1 | 8/2019 | Zhang et al. | |
| 2020/0041647 A1* | 2/2020 | Danziger ................ | G06T 7/521 |
| 2020/0132822 A1 | 4/2020 | Pimentel et al. | |
| 2021/0086763 A1* | 3/2021 | Albinsson ............. | B60W 10/04 |

OTHER PUBLICATIONS

Rieken, Sensor scan timing compensation in environment models for automated road vehicle (Year: 2016).*
PCT International Search Report and Written Opinion issued in corresponding application No. PCT/US2022/036877, dated Dec. 5, 2022.

* cited by examiner

*Primary Examiner* — Mohamed Charioui
*Assistant Examiner* — Dacthang P Ngo
(74) *Attorney, Agent, or Firm* — Maschoff Brennan (57) ABSTRACT

A method may include obtaining sensor data describing a total measurable world around a motion sensor. The method may include processing the sensor data to generate a pre-compensation scan of the total measurable world around the motion sensor based on the sensor data. The method may include determining a delay between the obtaining the sensor data and the generation of the pre-compensation scan. The method may include obtaining motion data corresponding to motion of the motion sensor and generating a motion model of the motion sensor based on the motion data. The method may include generating an after-compensation scan of the motion sensor using the delay and the motion model to compensate for continued motion during the delay.

16 Claims, 7 Drawing Sheets

FIG. 6

ADAPTIVE MOTION COMPENSATION OF PERCEPTION CHANNELS

CROSS-REFERENCE TO RELATED APPLICATIONS

This application claims the benefit of U.S. Patent Application Ser. No. 63/220,886, filed on Jul. 12, 2021, and U.S. Patent Application Ser. No. 63/366,738, filed on Jun. 21, 2022; the disclosures of which are incorporated herein by reference in their entireties.

FIELD OF THE INVENTION

The present disclosure generally relates to a system and method of adaptive motion compensation of perception channels.

BACKGROUND

An autonomous vehicle may scan an environment in which the autonomous vehicle is located using one or more sensors positioned on and/or around the autonomous vehicle. The autonomous vehicle may detect objects based on data collected by the sensors and avoid objects in a path of travel of the autonomous vehicle based on the detected objects.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining sensor data describing a total measurable world around a motion sensor. The method may include processing the sensor data to generate a pre-compensation scan of the total measurable world around the motion sensor based on the sensor data. The method may include determining a delay between the obtaining the sensor data and the generation of the pre-compensation scan. The method may include obtaining motion data corresponding to motion of the motion sensor and generating a motion model of the motion sensor based on the motion data. The method may include generating an after-compensation scan of the motion sensor using the delay and the motion model to compensate for continued motion during the delay.

In some embodiments, the sensor data describing the total measurable world may include Light Detection and Ranging (LiDAR) data or image data.

In some embodiments, the motion sensor may include at least one of an inertial measurement unit and a wheel encoder that is configured to count a number of revolutions of a wheel associated with a vehicle to which the motion sensor is coupled.

In some embodiments, the motion model may indicate motion of the motion sensor in one or more degrees of freedom, the degrees of freedom including at least one of: a forward-back axis, an up-down axis, a left-right axis, a roll, a yaw, and a pitch of a vehicle.

In some embodiments, the motion model of the motion sensor may include an initial motion model that represents a vehicle before the vehicle initiates movement and includes compensation parameters having values of zero. In some situations, a second frame of the motion data may indicate that the vehicle is stationary, and the motion model may be generated based on a first frame of the motion data that precedes the second frame of the motion data. The method may include indicating that the motion model is still the initial motion model responsive to the first frame representing the initial motion model.

In some embodiments, the delay between the obtaining the sensor data and the generation of the pre-compensation scan may be at most 100 milliseconds, and the motion data corresponding to the motion of the motion sensor may be captured at a capture rate of at most 20 milliseconds.

According to an aspect of an embodiment, one or more non-transitory computer-readable storage media configured to store instructions that, in response to being executed, cause a system to perform operations. The operations may include obtaining sensor data describing a total measurable world around a motion sensor. The method may include processing the sensor data to generate a pre-compensation scan of the total measurable world around the motion sensor based on the sensor data. The method may include determining a delay between the obtaining the sensor data and the generation of the pre-compensation scan. The method may include obtaining motion data corresponding to motion of the motion sensor and generating a motion model of the motion sensor based on the motion data. The method may include generating an after-compensation scan of the motion sensor using the delay and the motion model to compensate for continued motion during the delay.

In some embodiments, the sensor data describing the total measurable world may include Light Detection and Ranging (LiDAR) data or image data.

In some embodiments, the motion sensor may include at least one of an inertial measurement unit and a wheel encoder that is configured to count a number of revolutions of a wheel associated with a vehicle to which the motion sensor is coupled.

In some embodiments, the motion model may indicate motion of the motion sensor in one or more degrees of freedom, the degrees of freedom including at least one of: a forward-back axis, an up-down axis, a left-right axis, a roll, a yaw, and a pitch of a vehicle.

In some embodiments, the motion model of the motion sensor may include an initial motion model that represents a vehicle before the vehicle initiates movement and includes compensation parameters having values of zero. In some situations, a second frame of the motion data may indicate that the vehicle is stationary, and the motion model may be generated based on a first frame of the motion data that precedes the second frame of the motion data. The operations may include indicating that the motion model is still the initial motion model responsive to the first frame representing the initial motion model.

In some embodiments, the delay between the obtaining the sensor data and the generation of the pre-compensation scan may be at most 100 milliseconds, and the motion data corresponding to the motion of the motion sensor may be captured at a capture rate of at most 20 milliseconds.

According to an aspect of an embodiment, a system may include one or more processors and one or more non-transitory computer-readable storage media configured to store instructions that, in response to being executed, cause the system to perform operations. The operations may include obtaining sensor data describing a total measurable world around a motion sensor. The method may include processing the sensor data to generate a pre-compensation scan of the total measurable world around the motion sensor based on the sensor data. The method may include determining a delay between the obtaining the sensor data and the generation of the pre-compensation scan. The method may include obtaining motion data corresponding to motion of the motion sensor and generating a motion model of the motion sensor based on the motion data. The method may include generating an after-compensation scan of the motion sensor using the delay and the motion model to compensate for continued motion during the delay.

In some embodiments, the sensor data describing the total measurable world may include Light Detection and Ranging (LiDAR) data or image data.

In some embodiments, the motion sensor may include at least one of an inertial measurement unit and a wheel encoder that is configured to count a number of revolutions of a wheel associated with a vehicle to which the motion sensor is coupled.

In some embodiments, the motion model may indicate motion of the motion sensor in one or more degrees of freedom, the degrees of freedom including at least one of: a forward-back axis, an up-down axis, a left-right axis, a roll, a yaw, and a pitch of a vehicle.

In some embodiments, the motion model of the motion sensor may include an initial motion model that represents a vehicle before the vehicle initiates movement and includes compensation parameters having values of zero. In some situations, a second frame of the motion data may indicate that the vehicle is stationary, and the motion model may be generated based on a first frame of the motion data that precedes the second frame of the motion data. The operations may include indicating that the motion model is still the initial motion model responsive to the first frame representing the initial motion model.

In some embodiments, the delay between the obtaining the sensor data and the generation of the pre-compensation scan may be at most 100 milliseconds, and the motion data corresponding to the motion of the motion sensor may be captured at a capture rate of at most 20 milliseconds.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

The present disclosure relates to adaptive motion compensation for different types of sensor data, such as raw pointclouds of Light Detection and Ranging (LiDAR) data, image data, radar data, etc. Sensor data describing a total measurable world around a motion sensor (such as an Inertial Measurement Unit (IMU)) may be captured by one or more sensors (including the IMU itself). A time delay may exist between capturing sensor data at a first point in time and processing of the sensor data as a scan of the total measurable world around the IMU at a second point in time. During the time delay, the IMU and/or other associated sensors may be in motion such that the sensor data at the first point in time does not accurately reflect a position and/or orientation of the IMU and the other associated sensors at the second point in time (for example, when the IMU is part of a vehicle and that vehicle is in motion). Existing compensation systems may adjust the position and/or orientation of the IMU by a predetermined, fixed distance and/or angle, respectively. However, such compensation systems may not accurately reflect changes in the motion of the IMU.

The present disclosure relates to, among other things, a method and system of adaptive motion compensation. The adaptive motion compensation system may obtain sensor data describing the total measurable world around a given motion sensor and generate a pre-compensation scan of the total measurable world based on the obtained sensor data. The adaptive motion compensation system may generate a motion model of the motion sensor based on motion data of the motion sensor and generate an after-compensation scan of the total measurable world based on the pre-compensation scan and the motion model. Compensating the scan of the total measurable world around the motion sensor based on the motion model according to the present disclosure may improve the accuracy of motion compensation and the accuracy of downstream computations based on the sensor data associated with the motion sensor.

Embodiments of the present disclosure will be explained with reference to the accompanying drawings.

Figure 1:
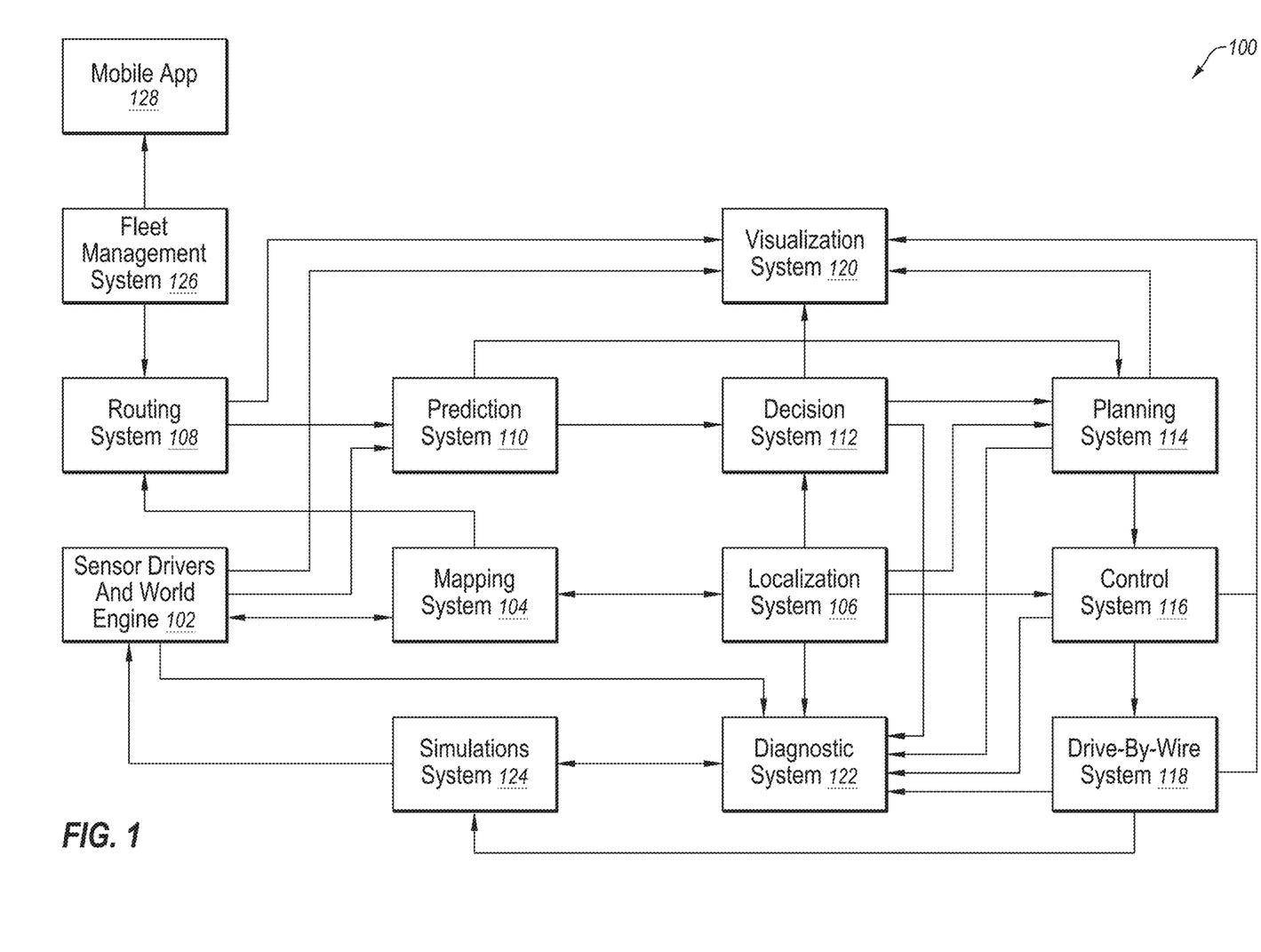
FIG. 1 illustrates an example embodiment of an autonomous driving system according to at least one embodiment of the present disclosure.

FIG. 1 illustrates an example embodiment of an autonomous driving system 100 according to at least one embodiment of the present disclosure. The autonomous driving system 100 may include one or more computer systems and/or software modules configured to perform one or more operations involved with driving an autonomous vehicle. Various aspects of the autonomous driving system 100 may be included on-board with the autonomous vehicle itself, or with a remote system in communication with the autonomous vehicle, such as a cloud computing system, a server, or a mobile device. In some embodiments, the autonomous driving system 100 may include sensor drivers and a world engine 102 that is configured to capture and process sensor data relating to an environment in which the autonomous vehicle travels, such as information relating to what objects are present in the environment and where such objects are located relative to the autonomous vehicle. The sensor data related to the autonomous vehicle's environment may be sent to a mapping system 104 to generate a virtual map of the environment. In some embodiments, the virtual map may be sent from the mapping system 104 back to the sensor drivers and world engine 102 to provide a map on which the sensor data relating to environmental objects may be oriented. Additionally or alternatively, the virtual map may provide a map onto which environmental topography may be plotted.

The virtual map of the mapping system 104 may be sent to a localization system 106 and/or a routing system 108. The localization system 106 may provide an estimated location of the autonomous vehicle within the environment and/or the virtual map, and the routing system 108 may compute a route between the estimated location of the autonomous vehicle to a designated destination along a valid path included in the virtual map.

In some embodiments, the sensor data of the sensor drivers and world engine 102 may be sent to a prediction system 110 that is configured to predict movement and/or trajectories of one or more objects in the vicinity of the autonomous vehicle and/or the autonomous vehicle itself. A decision system 112 may obtain the predicted object trajectories from the prediction system 110, and based on a location of the autonomous vehicle as determined by the localization system 106, the decision system 112 may determine one or more driving decisions according to various driving rules. The driving decisions determined by the decision system 112 may be sent to a planning system 114 that processes, parses, and/or queues the driving decisions for a downstream control system 116. In some embodiments, the control system 116 may generate control signals that are obtained by a drive-by-wire system 118 or another actuation system that controls one or more operations of the autonomous vehicle.

In some embodiments, the autonomous driving system 100 may include a visualization system 120 that is configured to obtain information from the sensor drivers and world engine 102, the prediction system 110, the decision system 112, the planning system 114, the control system 116, the drive-by-wire system 118, or any other computer system of the autonomous driving system 100. The visualization system 120 may generate two-dimensional and/or three-dimensional models of the autonomous vehicle, objects in the vicinity of the autonomous vehicle, and/or the environment in which the autonomous vehicle operates. Additionally or alternatively, the visualization system 120 may provide a visual representation of movement and/or predicted trajectories of the autonomous vehicle and/or any of the nearby objects.

In some embodiments, the autonomous driving system 100 may include a diagnostics system 122 that is configured to obtain information from the sensor drivers and world engine 102, the prediction system 110, the decision system 112, the planning system 114, the control system 116, the drive-by-wire system 118, or any other computer system of the autonomous driving system 100. The diagnostics system 122 may run diagnostic tests to assess the accuracy and/or validity of determinations and decisions made by other computer systems of the autonomous driving system 100.

In these and other embodiments, the diagnostics system 122 may be communicatively coupled to a simulations system 124 that provides a virtual environment in which the determinations and decisions made by other computer systems and/or software modules of the autonomous driving system 100 may be simulated to identify any issues with the simulated determinations and decisions. Additionally or alternatively, the simulations system 124 may obtain information from the drive-by-wire system 118 so that the simulations system 124 may run simulations based on control signals implemented by the autonomous vehicle in the real world. The simulations system 124 may virtually determine movements of the autonomous vehicle and/or of one or more objects in the vicinity of the autonomous vehicle. Based on the virtually determined movements, the simulations system 124 may determine updated positions of the autonomous vehicle and/or of the surrounding objects. In some embodiments, the simulations system 124 may provide the virtually determined movements and/or the updated positions to the sensor drivers and world engine 102 so that the total measurable world as represented by the sensor drivers and world engine 102 may be updated based on the simulation results.

In some embodiments, the autonomous driving system 100 may include a fleet management system 126 that obtains information from multiple autonomous vehicles communicatively coupled to the fleet management system 126. The fleet management system 126 may relay information between different autonomous vehicles in communication with the fleet management system 126 to coordinate operations of the multiple autonomous vehicles. In these and other embodiments, a user managing fleet operations may use a mobile app 128 to receive information from and/or send information or commands to a fleet of autonomous vehicles.

Modifications, additions, or omissions may be made to the autonomous driving system 100 without departing from the scope of the present disclosure. For example, the designations of different elements in the manner described is meant to help explain concepts described herein and is not limiting. For instance, in some embodiments, the sensor drivers and world engine 102, the mapping system 104, the localization system 106, the routing system 108, the prediction system 110, the decision system 112, the planning system 114, the control system 116, the drive-by-wire system 118, the visualization system 120, the diagnostics system 122, the simulations system 124, the fleet management system 126, and the mobile app 128 are delineated in the specific manner described to help with explaining concepts described herein but such delineation is not meant to be limiting. Further, the autonomous driving system 100 may include any number of other elements or may be implemented within other systems or contexts than those described.

Figure 2:
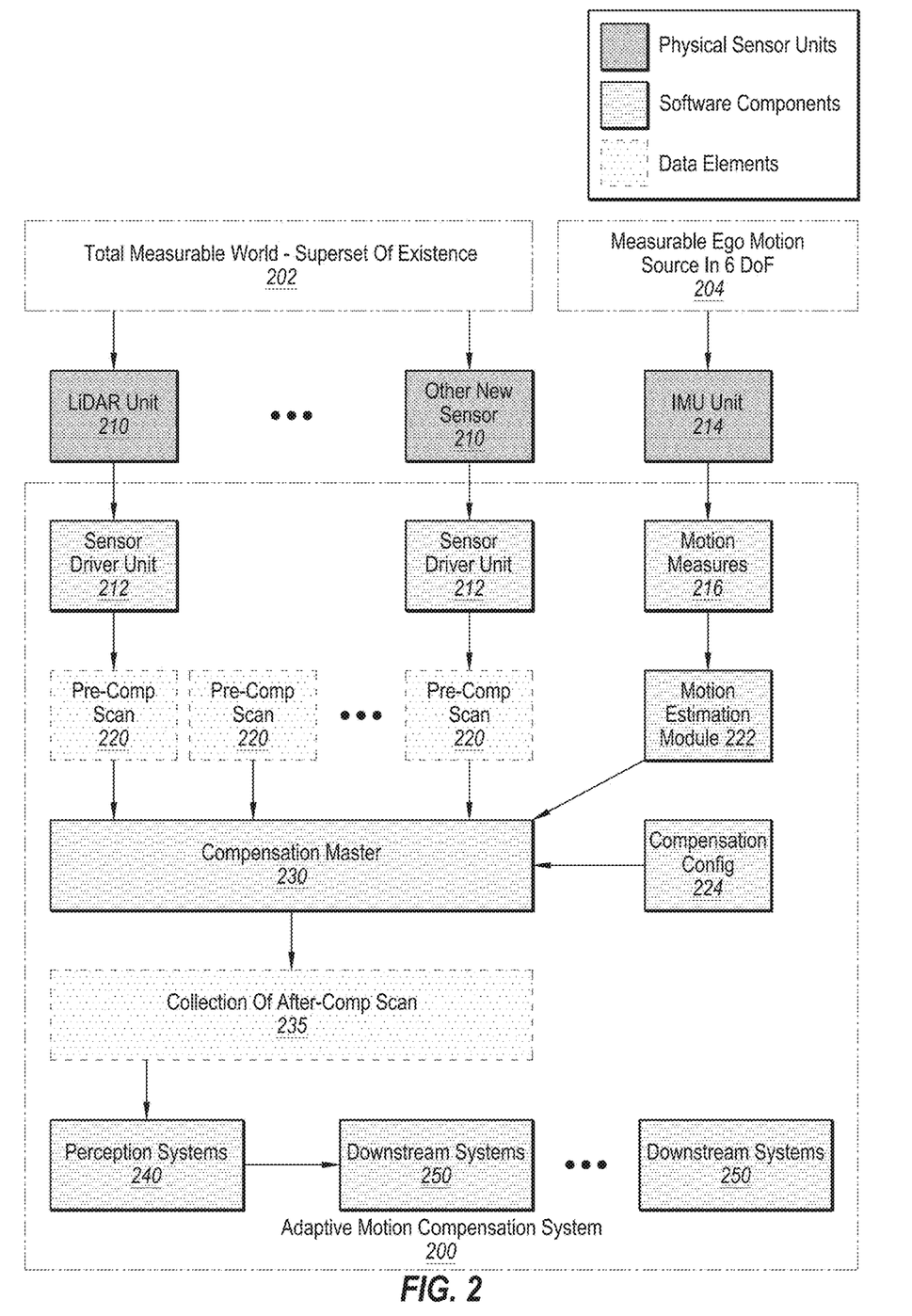
FIG. 2 illustrates a diagram of a system architecture of an adaptive motion compensation system according to the present disclosure.

FIG. 2 illustrates a diagram of a system architecture of an adaptive motion compensation system 200 according to at least one embodiment of the present disclosure. In some embodiments, the adaptive motion compensation system 200 may include one or more sensors 210 and corresponding sensor drive units 212 that facilitate capturing sensor data. The sensor data captured by the sensors 210 may be presented as a pre-compensation scan 220 representing a total measurable world 202 within a scanning range of the sensors 210. The adaptive motion compensation system 200 may include one or more motion sensors, such as an Inertial Measurement Unit (IMU) 214, with which the sensor data may be associated, a motion estimation module 222, and/or a compensation configuration module 224. The adaptive motion compensation system 200 may include a compensation master 230 configured to generate after-compensation scans 235 representing the total measurable world 202 based on the pre-compensation scans 220 provided by the sensors 210 and the motion measurements 216 provided by the IMU 214.

In some embodiments, the sensor data represented by pre-compensation scans 220 may be captured while the corresponding IMU 214 may or may not be in motion such that the pre-compensation scans 220 describe the total measurable world 202 around the IMU 214 at a first point in time. The pre-compensation scan 220 may not be representative of the current total measurable world 202 around the IMU 214 because the sensors 210 from which the sensor data is obtained may include a delay between capture of the sensor data and rendering of a corresponding pre-compensation scan 220. Consequently, the motion of the IMU 214 may cause the environment around the IMU 214 to change during the delay period (e.g., while a vehicle continues to travel down the road). Because of the delay, the total measurable world 202 around the IMU 214 may correspond to sensor data representative of the total measurable world 202 at a second point in time to provide a more accurate representation of the total measurable world 202.

For example, a LiDAR sensor 210 may capture a first set of LiDAR data that describes the total measurable world 202 at a first given point in time. The LiDAR sensor 210 may include a refresh rate (e.g., 100 milliseconds) between capturing the first set of LiDAR data and a second set of LiDAR data that describes the total measurable world 202 at a second given point in time. The time delay between the first given point in time and the second given point in time and movement of a corresponding IMU 214 may cause the first set of LiDAR data to not accurately represent the total measurable world 202 around the corresponding IMU 214 because motion of the corresponding IMU 214 changes the total measurable world 202 around the corresponding IMU 214 during the refresh rate of the LiDAR sensor 210. As another example, a camera sensor 210 may capture image data describing the total measurable world 202 around the IMU 214 at a third given point in time. The camera sensor 210 may include an exposure period and/or a shutter period (e.g., 125 ms, 250 ms, etc.) such that the total measurable world 202 around the IMU 214 has changed during the exposure period and/or the shutter period. Consequently, the image data captured at the third given point in time may not accurately represent the total measurable world 202 around the IMU 214.

The motion estimation module 222 and/or the compensation configuration module 224 may include code and routines configured to enable a computing system to perform one or more operations. The motion estimation module 222 and/or the compensation configuration module 224 may be implemented using hardware including a processor, a microprocessor (e.g., to perform or control performance of one or more operations), a field-programmable gate array (FPGA), or an application-specific integrated circuit (ASIC). In some other instances, the motion estimation module 222 and/or the compensation configuration module 224 may be implemented using a combination of hardware and software. In the present disclosure, operations described as being performed by the motion estimation module 222 and/or the compensation configuration module 224 may include operations that the motion estimation module 222 and/or the compensation configuration module 224 may direct a corresponding system to perform. The motion estimation module 222 and/or the compensation configuration module 224 may be configured to perform a series of operations with respect to the pre-compensation scan 220 and/or sensor data captured by the one or more sensors 210 and/or motion measurements 216 and/or one or more motion models associated with the IMU 214.

Figure 3:
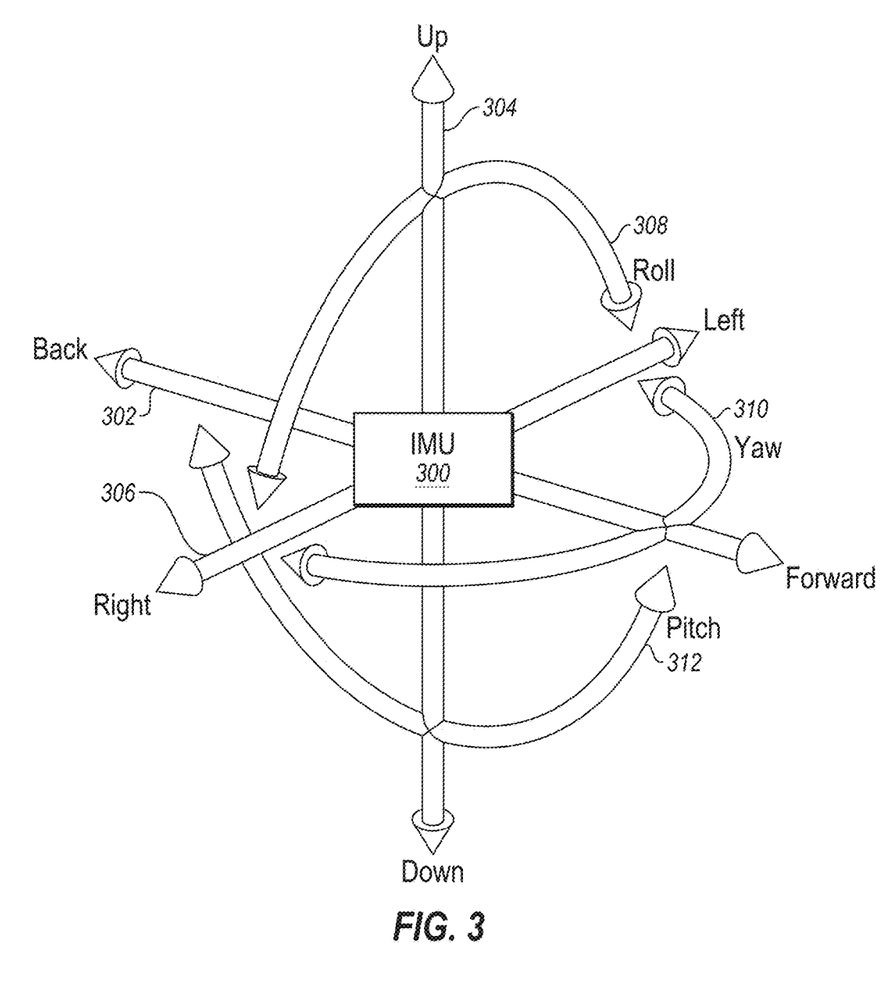
FIG. 3 illustrates an example of an inertial measurement unit (IMU) associated with an autonomous vehicle according to the present disclosure.

The motion estimation module 222 may obtain motion data captured by one or more IMUs 214 and generate a motion model associated with the IMUs 214. The IMUs 214 may be positioned to represent an object capable of movement. For example, a given IMU 214 may be positioned at a center of mass of an autonomous vehicle such that motion measurements 216 captured by the given IMU 214 represents motion of the autonomous vehicle. An example embodiment of a given IMU 300 is illustrated in FIG. 3. The IMU 300 illustrated in FIG. 3 may determine the motion of a given object, such as the autonomous vehicle, in one or more degrees of freedom. For example, the IMU 300 may capture motion data in a front-back direction 302, in an up-down direction 304, in a left-right direction 306, along one or more rotational axes (e.g., roll 308, yaw 310, and/or pitch 312), or some combination thereof. While the IMU 214 is used as an example, it will be appreciated that the motion estimation module 222 may use input from any number of sensors to create a motion model that is predictive of the expected motion of the IMU 214 and/or the associated vehicle and other sensors. The developed motion model may monitor and/or track previous motion and predict future motion based on the previous motion as monitored by the motion sensors.

Returning to the description of FIG. 2, the IMU 214 may include a frequency of capturing motion data that is faster than the delay and/or refresh rate of data capture for the one or more other sensors 210. For example, a given LiDAR sensor 210 in communication with the IMU 214 may include a refresh rate of 100 ms, while the same IMU 214 may include a delay of 10 ms to 20 ms between capturing data. In this and other examples, changes in the LiDAR data captured by the given LiDAR sensor 210 may occur at a slower rate than changes in the motion data captured by the IMU 214 such that compensating the LiDAR data based on a model of the motion measurements 216 associated with the IMU 214 may improve the motion compensation accuracy of the LiDAR data.

The compensation master 230 may analyze the motion model associated with the IMU 214 provided by the motion estimation module 222 and generate an after-compensation scan 235 based on the modeled motion of the IMU 214 and the pre-compensation scan 220 associated with the IMU 214. In some embodiments, the compensation master 230 may be configured to determine a delay between capturing a set of sensor data representing the pre-compensation scan 220 and processing of the set of sensor data. The compensation master 230 may be configured to determine a first position of the IMU 214 based on the set of sensor data and generate the after-compensation scan 235 of the IMU 214 by predicting a second position of the IMU 214 based on the delay and the motion model associated with the IMU 214. For example, a delay associated with a given LiDAR sensor 210 may be one second, and a motion model associated with an IMU 214 associated with the given LiDAR sensor 210 may indicate the IMU 214 is moving forward at five meters per second along a given trajectory. In such an example, the compensation master 230 may generate an after-compensation scan 235 of the sensor data captured by the given LiDAR sensor 210 in which the position of the IMU 214 is moved forward by five meters along the given trajectory and as if the LiDAR sensor 210 had been moved by the same motion as the IMU 214.

In these and other embodiments, the motion model may indicate motion of the IMU 214 in one or more degrees of freedom. As previously mentioned in relation to FIG. 3, the IMU 300 may include, for example, six degrees of freedom including motion in the front-back direction 302, in the up-down direction 304, in the left-right direction 306, and/or along at least one of three rotational axes (roll 308, yaw 310, and/or pitch 312). The compensation master 230 may generate the after-compensation scan 235 based on any of the degrees of freedom included in the motion model. For example, a given IMU 214 representing an autonomous vehicle may be turning to the left (e.g., making a left turn at a traffic intersection). In this example, the motion model corresponding to the given IMU 214 may include motion detected in a left-right direction and/or rotation along one or more axes. The after-compensation scan 235 corresponding to the given IMU 214 may include panning and/or rotation of a field of view of the pre-compensation scan 220. Additionally or alternatively, the after-compensation scan 235 may include adjusting a position of the IMU 214 forward and to the left relative to the position of the IMU 214 in the pre-compensation scan 220.

In some embodiments, the motion model associated with the IMU 214 may be processed by the compensation configuration module 224, which may improve the accuracy and/or relevance of the motion data. For example, the compensation configuration module 224 may determine one or more compensation boundaries to facilitate filtering out noisy data from the motion model associated with the IMU 214 and/or other motion sensors within a region included between the compensation boundaries. Additionally or alternatively, the compensation configuration module 224 may ensure one or more subsystems included in the adaptive motion compensation system 200 work in a satisfactory manner with the IMU 214. For example, the compensation configuration module 224 may ensure operations of the subsystems are consistent with a frequency, a range, a sensitivity, or some combination thereof of the IMU 214.

In some embodiments, the compensation configuration module 224 may be configured to determine compensation parameters and/or generate initial motion frames to facilitate motion modeling by the motion estimation module 222. For example, the compensation configuration module 224 may set the compensation parameters corresponding to the initial motion frames at zero values. As the autonomous vehicle moves, the IMU 214 and/or other motion sensors may capture motion measurements 216 and begin to build the motion model based on the captured motion. In some situations, the autonomous vehicle may stop, such as in response to approaching an obstacle, traffic signs, reaching a destination, or some combination thereof, and the motion of the autonomous vehicle as measured by the IMU 214 and/or other motion sensors may return to various zero values. In these and other situations, the compensation configuration module 224 may check a first frame during analysis of a second frame in which the first frame precedes the second frame and the second frame represents the motion frame in which the autonomous vehicle comes to a stop. Responsive to the first motion frame being an initial motion frame (e.g., a motion frame in which the initial compensation parameters include zero values), the compensation configuration module 224 may determine that the motion model is being built based on the initial motion frame. Responsive to the first frame being an ordinary motion frame (e.g., the autonomous vehicle was previously in motion and includes one or more non-zero initial compensation parameters), the compensation configuration module 224 may update the motion model based on compensation parameters associated with the first frame. Additionally or alternatively, the compensation configuration module 224 may exclude certain data from the compensation configuration based on the motion measures being outside a threshold value of viability (e.g., the motion measures indicating the vehicle has moved 5 meters in one second when traveling at a speed of 2 meters per second).

In some embodiments, the compensation configuration module 224 may utilize a threshold number of instances of data from the IMU 214 and/or other motion sensors, such as the three most recent readings, the five most recent readings, the ten most recent readings, etc., over which the motion is predicted and/or extrapolated. In these and other embodiments, a weighting algorithm may be used such that more recent data points are given greater weight than data points of motion of the IMU 214 that are further back in time.

In some embodiments, the IMU 214 may be paired with or be replaced by one or more other motion sensors to verify, supplement, or otherwise add to data collection relating to the motion measurements 216 of the autonomous vehicle. For example, the IMU 214 may be paired with a wheel encoder that is configured to count revolutions of one or more wheels corresponding to the autonomous vehicle to which the IMU 214 is coupled. The wheel encoder and/or the IMU 214 may be configured to determine a distance of movement, a speed of movement, and/or any other parameters associated with movement of the autonomous vehicle based on the number of wheel revolutions, a time elapsed for a given wheel revolution count, a time elapsed per wheel revolution, or some combination thereof. In some embodiments, the various advantages of the various types of motion sensors may be leveraged when building the motion model. For example, a wheel encoder may provide accurate information regarding an amount of distance traveled, an IMU may provide accurate information regarding motion in various directions, radar data may provide accurate speed information, just to mention a few examples.

Modifications, additions, or omissions may be made to the adaptive motion compensation system 200 without departing from the scope of the present disclosure. For example, the designations of different elements in the manner described is meant to help explain concepts described herein and is not limiting. For instance, in some embodiments, the motion model generation, the motion estimation configuration, and/or the motion compensation process are delineated in the specific manner described to help with explaining concepts described herein but such delineation is not meant to be limiting. Further, the adaptive motion compensation system 200 may include any number of other elements or may be implemented within other systems or contexts than those described.

Figure 4A:
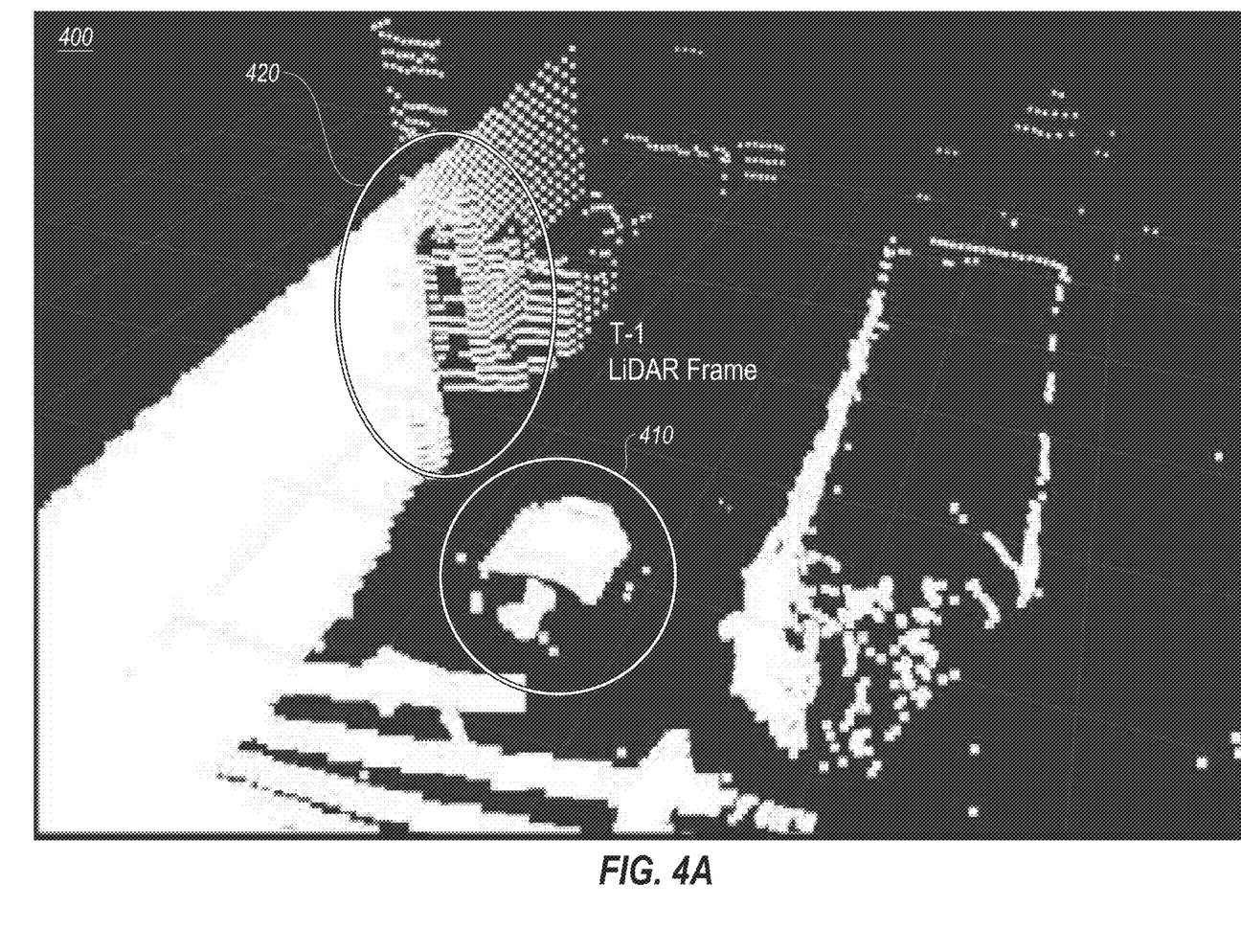
FIG. 4A illustrates a first frame of light detection and ranging (LiDAR) data captured from a total measurable world at a first time.
Figure 4B:
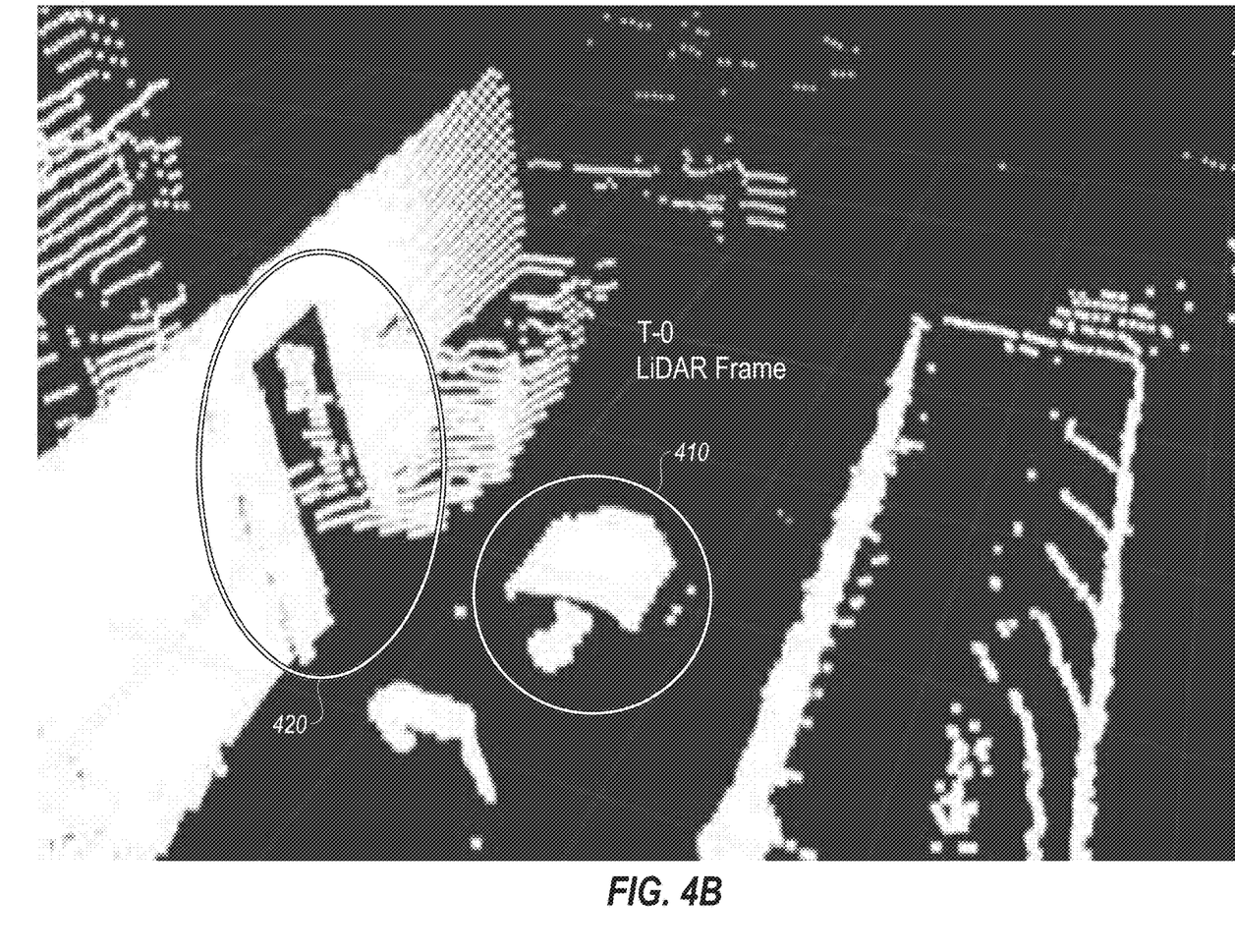
FIG. 4B illustrates a second frame of LiDAR data captured at a second time.

FIG. 4A illustrates a first frame 400 of LiDAR data captured from a total measurable world at a first time ("$t_0$"), and FIG. 4B illustrates a second frame 402 of LiDAR data captured at a second time ("$t_1$"). At the first time, the LiDAR data may indicate that a given IMU, represented by LiDAR points in region 410 at a front nose of the region 410, is approximately adjacent to an opening, represented by LiDAR points in region 420. The IMU may move forward as the LiDAR sensor that captured the first frame 400 of LiDAR data refreshes. Consequently, the first frame 400 of LiDAR data may not accurately represent the position of the IMU and/or the total measurable world around the IMU. Rather, the second frame 402 of LiDAR data captured at the second time, in which the IMU represented by the region 420 is ahead of the opening represented by the region 410, may include a more accurate representation of the total measurable world around the IMU.

In some embodiments, the adaptive motion compensation system 200 may capture LiDAR data the same as or similar to the first frame of LiDAR data and render the LiDAR data as a pre-compensation scan 220. The adaptive motion compensation system 200 may generate a post-compensation scan 235 that includes LiDAR data that is the same as or similar to the second frame 402 of LiDAR data as illustrated in FIG. 4B.

Figure 5:
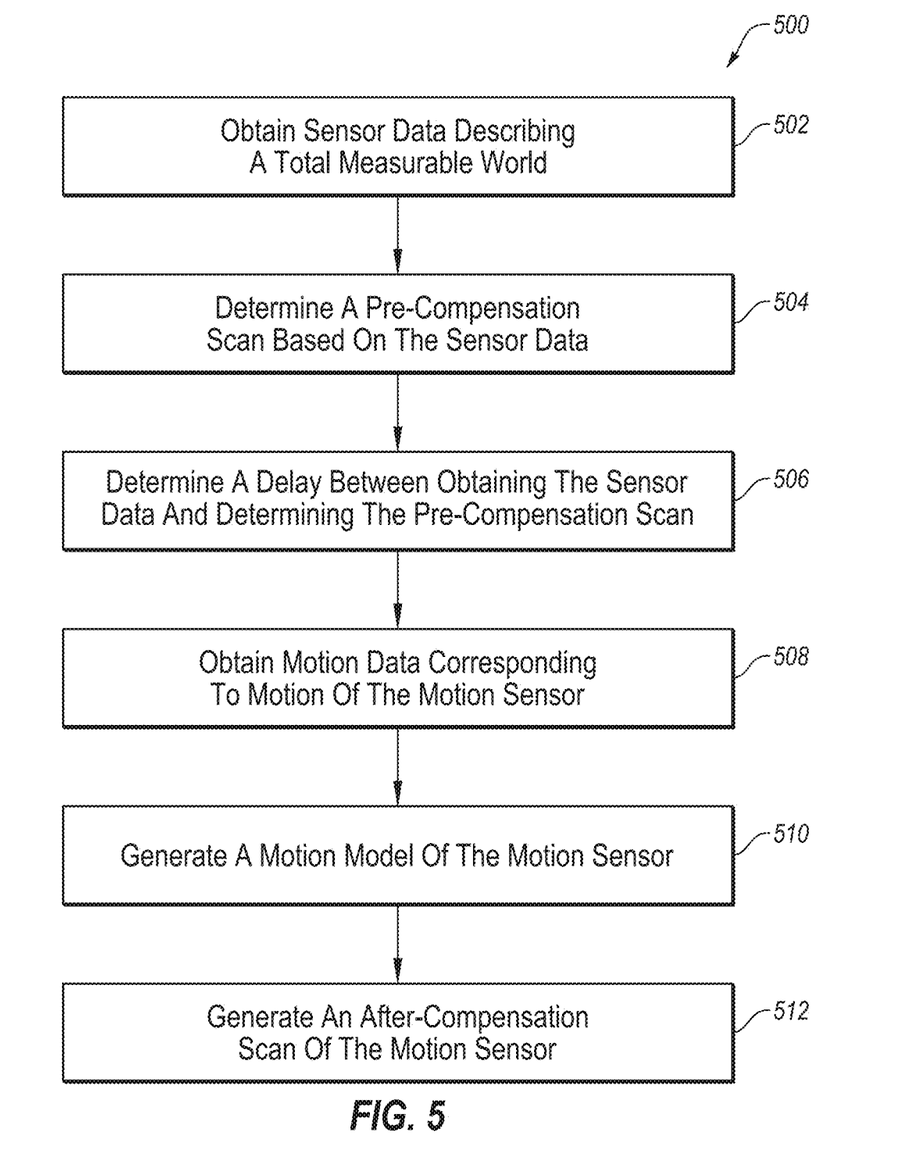
FIG. 5 is a flowchart of an example method of performing motion compensation according to at least one embodiment of the present disclosure.

FIG. 5 is a flowchart of an example method 500 of performing motion compensation according to at least one embodiment of the present disclosure. The method 500 may be performed by any suitable system, apparatus, or device. For example, the motion compensation system 200 of FIG. 2 may perform one or more operations associated with the method 500. Although illustrated with discrete blocks, the steps and operations associated with one or more of the blocks of the method 500 may be divided into additional blocks, combined into fewer blocks, or eliminated, depending on the particular implementation.

The method 500 may begin at block 502, where sensor data describing a total measurable world around a motion sensor is obtained. In some embodiments, the sensor data may include LiDAR data captured by one or more LiDAR sensors positioned at the same or a similar position as the motion sensor. Additionally or alternatively, the sensor data may include image data captured by one or more camera sensors positioned at the same or a similar position as the motion sensor. In some embodiments, the motion sensor may include an IMU, such as the IMU 214 or the IMU 300 as described in relation to FIGS. 2 and 3, respectively.

At block 504, a pre-compensation scan of the total measurable world around the motion sensor may be determined based on the sensor data obtained at block 502. The pre-compensation scan may represent an aggregation or some other combination of the sensor data to depict the total measurable world. For example, the first frame 400 of LiDAR data as depicted in FIG. 4A may be a pre-compensation scan of a total measurable world around a vehicle.

At block 506, a delay between the obtaining of the sensor data at block 502 and the determining of the pre-compensation scan at block 504 may be determined. In some situations, capturing of the sensor data by one or more corresponding sensors may involve latency, processing time, a shutter period, a refresh rate of a LiDAR sensor, and/or any other time lags between the acts of capturing the sensor data and rendering of the sensor data as the pre-compensation scan. Consequently, the pre-compensation scan and the sensor data associated with the pre-compensation scan may represent the total measurable world at a first point in time, but the pre-compensation scan may be rendered at a second point in time after the first point in time corresponding to the delay.

At block 508, motion data corresponding to motion of the motion sensor may be obtained. In some embodiments, the motion data may include speed, velocity, acceleration, momentum, orientation, and/or any other motion parameters that may be associated with a moving object. In these and other embodiments, the motion data may be represented in one or more degrees of freedom, such as along a front-back axis, an up-down axis, a left-right axis, a roll, a yaw, a pitch, or some combination thereof.

At block 510, a motion model of the motion sensor may be generated based on the motion data obtained at block 508. In some embodiments, the motion model may represent an aggregation of the motion data captured by the motion sensor in which the motion model represents the overall path, orientation, speed, or some combination thereof of the motion sensor. For example, the motion data may include information regarding a direction of movement of the motion sensor and a speed of the motion sensor, which may be aggregated as a motion model representing a velocity of the motion sensor. As another example, the motion data may indicate that the motion sensor is moving along an arced trajectory over time (e.g., the direction of the motion sensor is changing along two or more axes over time), and the corresponding motion model may represent the arced movement of the motion sensor. As another example, the motion model may represent an expected or predicted trajectory of motion of the motion sensor based on the previous motion of the motion sensor built out as a model of the motion of the motion sensor. For example, tracked or historical motion of the one or more motion sensors may be aggregated together to form a previous trajectory and according to one or more rules or heuristics, a most likely trajectory in the future may be predicted as the motion model. In some embodiments, the motion model may rely on multiple types of sensor data, and giving greater weight or emphasis to sensor data known or designated as particularly accurate regarding a particular aspect of motion, such as radar data in measuring speed, IMU data in measuring degrees of motion in various directions, among others.

At block 512, an after-compensation scan of the motion sensor may be generated based on the delay determined at block 506 and the motion model generated at block 510. The after-compensation scan of the motion sensor may represent the total measurable world as depicted by the pre-compensation scan but with motion compensation to adjust the pre-compensation scan based on the delay between sensor data capture and sensor data rendering and the corresponding amount of motion which the sensor that captured the data would have undergone during the delay. For example, the second frame 402 of LiDAR data depicted in FIG. 4B may represent an after-compensation scan that is based on the pre-compensation scan depicted in the first frame 400 of LiDAR data in FIG. 4A, but compensated based on the continued motion of the vehicle to which the LiDAR sensor is fixed. The after-compensation scan may provide a more accurate representation of the total measurable world than the pre-compensation scan for a given point in time because the after-compensation scan corrects the sensor data associated with the pre-compensation scan based on the delay as determined at block 506 and the corresponding continued movement of the vehicle.

Modifications, additions, or omissions may be made to the method 500 without departing from the scope of the disclosure. For example, the designations of different elements in the manner described is meant to help explain concepts described herein and is not limiting. Further, the method 500 may include any number of other elements or may be implemented within other systems or contexts than those described.

Figure 6:
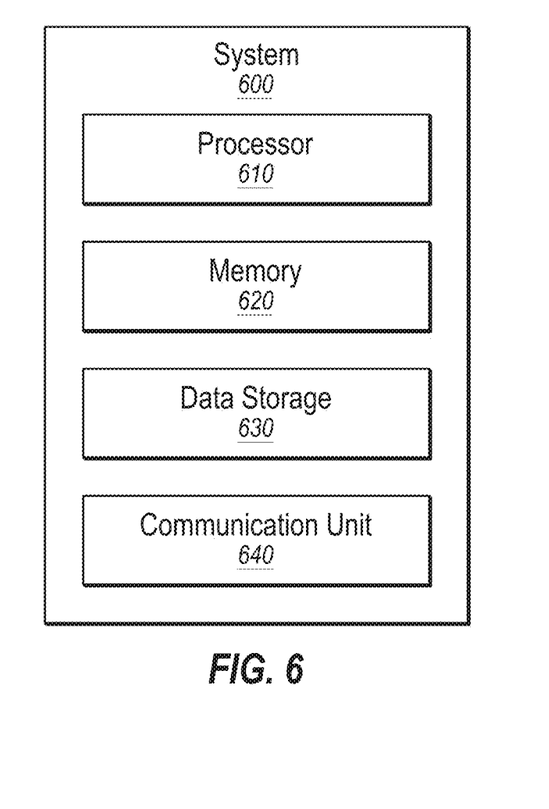
FIG. 6 is an example computing system.

FIG. 6 illustrates an example computing system 600, according to at least one embodiment described in the present disclosure. The computing system 600 may include a processor 610, a memory 620, a data storage 630, and/or a communication unit 640, which all may be communicatively coupled. Any or all of the adaptive motion compensation system 200 of FIG. 2 may be implemented as a computing system consistent with the computing system 600, including, for example, the motion estimation module 222, the compensation configuration module 224, and/or the compensation master 230.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of network or physical locations that are configured to perform individually or collectively any number of operations described in the present disclosure. In some embodiments, the processor 610 may interpret and/or execute program instructions and/ or process data stored in the memory 620, the data storage 630, or the memory 620 and the data storage 630. In some embodiments, the processor 610 may fetch program instructions from the data storage 630 and load the program instructions into the memory 620.

After the program instructions are loaded into the memory 620, the processor 610 may execute the program instructions, such as instructions to perform operations associated with the motion model generation, the motion estimation configuration, and/or the motion compensation process.

The memory 620 and the data storage 630 may include computer-readable storage media or one or more computer-readable storage mediums for having computer-executable instructions or data structures stored thereon. Such computer-readable storage media may be any available media that may be accessed by a general-purpose or special-purpose computer, such as the processor 610. For example, the memory 620 and/or the data storage 630 may store sensor data, pre-compensation scans, motion data, motion models, and/or post-compensation scans associated with the motion sensor. In some embodiments, the computing system 600 may or may not include either of the memory 620 and the data storage 630.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations.

The communication unit 640 may include any component, device, system, or combination thereof that is configured to transmit or receive information over a network. In some embodiments, the communication unit 640 may communicate with other devices at other locations, the same location, or even other components within the same system. For example, the communication unit 640 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 640 may permit data to be exchanged with a network and/or any other devices or systems described in the present disclosure. For example, the communication unit 640 may allow the system 600 to communicate with other systems, such as computing devices and/or other networks.

One skilled in the art, after reviewing this disclosure, may recognize that modifications, additions, or omissions may be made to the system 600 without departing from the scope of the present disclosure. For example, the system 600 may include more or fewer components than those explicitly illustrated and described.

The embodiments described in the present disclosure may include the use of a special purpose or general-purpose computer including various computer hardware or software modules. Further, embodiments described in the present disclosure may be implemented using computer-readable media for having computer-executable instructions or data structures stored thereon.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:

obtaining sensor data describing a total measurable world around a motion sensor at a first time point that represents a current time, the motion sensor being positioned at a center of mass of an autonomous vehicle so that motion of the motion sensor represents motion of the autonomous vehicle;

processing the sensor data to generate a pre-compensation scan that represents the total measurable world around the autonomous vehicle at the first time point based on the sensor data;

determining a delay between the obtaining the sensor data at the first time point and the generation of the pre-compensation scan at a second time point that occurs later than the first time point at a future time that has not yet occurred, the delay representing a time taken to process the sensor data to generate the pre-compensation scan;

obtaining motion data corresponding to motion of the motion sensor at the first time point and the second time point;

generating a motion model of the motion sensor at the second time point based on the motion data; and generating an after-compensation scan of the motion sensor that represents the total measurable world around the autonomous vehicle at the second time point using the delay and the motion model to compensate for continued motion of the autonomous vehicle during the delay.

2. The method of claim 1, wherein the sensor data describing the total measurable world includes Light Detection and Ranging (LiDAR) data or image data.

3. The method of claim 1, wherein the motion sensor includes an inertial measurement unit.

4. The method of claim 1, wherein the motion model indicates motion of the motion sensor in one or more degrees of freedom, the degrees of freedom including at least one of: a forward-back axis, an up-down axis, a left-right axis, a roll, a yaw, and a pitch of a vehicle.

5. The method of claim 1, wherein the motion model of the motion sensor includes an initial motion model that represents a vehicle before the vehicle initiates movement at the first time point and includes compensation parameters having values of zero.

6. The method of claim 5, wherein:
a second frame of the motion data at the second time point indicates that the vehicle is stationary;
the motion model is generated based on a first frame of the motion data at the first time point that precedes the second frame of the motion data at the second time point; and
responsive to the first frame representing the initial motion model, indicating that the motion model is still the initial motion model.

7. The method of claim 1, wherein:
the delay between the obtaining the sensor data and the generation of the pre-compensation scan is at most 100 milliseconds; and
the motion data corresponding to the motion of the motion sensor is captured at a capture rate of at most 20 Hertz (Hz).

8. One or more non-transitory computer-readable storage media configured to store instructions that, in response to being executed, cause a system to perform operations, the operations comprising:
obtaining sensor data describing a total measurable world around a motion sensor at a first time point, the motion sensor being positioned at a center of mass of an autonomous vehicle so that motion of the motion sensor represents motion of the autonomous vehicle;
processing the sensor data to generate a pre-compensation scan that represents the total measurable world around the autonomous vehicle at the first time point based on the sensor data;
determining a delay between the obtaining the sensor data at the first time point and the generation of the pre-compensation scan at a second time point that occurs later than the first time point, the delay representing a time taken to process the sensor data to generate the pre-compensation scan;
obtaining motion data corresponding to motion of the motion sensor at the first time point and the second time point;
generating a motion model of the motion sensor at the second time point based on the motion data, wherein the motion model represents a vehicle before the vehicle initiates movement at the first time point and includes compensation parameters having values of zero; and
generating an after-compensation scan of the motion sensor that represents the total measurable world around the autonomous vehicle at the second time point using the delay and the motion model to compensate for continued motion of the autonomous vehicle during the delay.

9. The one or more non-transitory computer-readable storage media of claim 8, wherein the sensor data describing the total measurable world includes Light Detection and Ranging (LiDAR) data or image data.

10. The one or more non-transitory computer-readable storage media of claim 8, wherein the motion sensor includes an inertial measurement unit.

11. The one or more non-transitory computer-readable storage media of claim 8 wherein:
a second frame of the motion data at the second time point indicates that the vehicle is stationary;
the motion model is generated based on a first frame of the motion data at the first time point that precedes the second frame of the motion data at the second time point; and
responsive to the first frame representing the motion model, indicating that the motion model is still the motion model.

12. The one or more non-transitory computer-readable storage media of claim 11, wherein:
the delay between the obtaining the sensor data and the generation of the pre-compensation scan is at most 100 milliseconds; and
the motion data corresponding to the motion of the motion sensor is captured at a capture rate of at most 20 Hertz (Hz).

13. A system comprising:
one or more processors; and
one or more non-transitory computer-readable storage media configured to store instructions that, in response to being executed, cause the system to perform operations, the operations comprising:
obtaining sensor data describing a total measurable world around a motion sensor at a first time point, the motion sensor being positioned at a center of mass of an autonomous vehicle so that motion of the motion sensor represents motion of the autonomous vehicle;
processing the sensor data to generate a pre-compensation scan that represents the total measurable world around the autonomous vehicle at the first time point based on the sensor data;
determining a delay between the obtaining the sensor data at the first time point and the generation of the pre-compensation scan at a second time point that occurs later than the first time point, the delay representing a time taken to process the sensor data to generate the pre-compensation scan;

obtaining motion data corresponding to motion of the motion sensor at the first time point and the second time point;

generating a motion model of the motion sensor at the second time point based on the motion data, wherein:
the motion model includes an initial motion model that represents a vehicle before the vehicle initiates movement at the first time point and includes compensation parameters having values of zero;
a second frame of the motion data at the second time point indicates that the vehicle is stationary;
the motion model is generated based on a first frame of the motion data at the first time point that precedes the second frame of the motion data at the second time point; and
responsive to the first frame representing the initial motion model,
indicating that the motion model is still the motion model; and generating an after-compensation scan of the motion sensor that represents the total measurable world around the autonomous vehicle at the second time point using the delay and the motion model to compensate for continued motion of the autonomous vehicle during the delay.

14. The system of claim 13, wherein the motion sensor includes an inertial measurement unit.

15. The system of claim 13, wherein the motion model indicates motion of the motion sensor in one or more degrees of freedom, the degrees of freedom including at least one of: a forward-back axis, an up-down axis, a left-right axis, a roll, a yaw, and a pitch of a vehicle.

16. The system of claim 13, wherein:
the delay between the obtaining the sensor data and the generation of the pre-compensation scan is at most 100 milliseconds; and
the motion data corresponding to the motion of the motion sensor is captured at a capture rate of at most 20 Hertz (Hz).

* * * * *